United States Patent [19]
Nishio et al.

[11] Patent Number: 5,469,350
[45] Date of Patent: Nov. 21, 1995

[54] VOLTAGE BOOSTING POWER FAILURE PROTECTED POWER SUPPLY DEVICE

[75] Inventors: Hisashi Nishio, Suita; Toru Arai, Kyoto; Masaru Nishizuka, Shijonawate; Atsushi Makitani, Toyonaka, all of Japan

[73] Assignee: Sansha Electric Manufacturing Co., Ltd., Osaka, Japan

[21] Appl. No.: 257,702

[22] Filed: Jun. 10, 1994

[30] Foreign Application Priority Data

Aug. 19, 1993 [JP] Japan .................. 5-228341

[51] Int. Cl.$^6$ .................. H02H 7/125
[52] U.S. Cl. .................. 363/55; 363/58
[58] Field of Search .................. 363/55, 56, 57, 363/58

[56] References Cited

U.S. PATENT DOCUMENTS

| | | | |
|---|---|---|---|
| 4,533,986 | 8/1985 | Jones | 363/56 X |
| 4,823,247 | 4/1989 | Tamoto | 363/56 X |
| 5,369,563 | 11/1994 | Miller | 363/56 |

FOREIGN PATENT DOCUMENTS 525953  4/1993  Japan .

Primary Examiner—Peter S. Wong
Assistant Examiner—Y. Jessica Han
Attorney, Agent, or Firm—Banner & Allegretti, Ltd.

[57] ABSTRACT

A voltage boosting power supply, wherein a commercial power supply of 100 volt a.c., for example, is used as its primary power source, the input from the power source is accumulated in a capacitor and the accumulated power is then converted into a boosted a.c. power for delivery by means of an invertor, and which is provided with a storage battery as a preliminary power source for protection against power failure and arranged to disconnect the a.c. power supply from the capacitor and, instead, connect the battery across the capacitor through a high frequency switching element by switch means which operate in response to a power failure signal from a power failure detector. Accordingly, the output voltage of the battery is boosted by the capacitor and then applied to the invertor and, therefore, the output voltage can be raised without increase of the capacity of the battery and consequent increase in the size and weight of the device.

1 Claim, 1 Drawing Sheet

VOLTAGE BOOSTING POWER FAILURE PROTECTED POWER SUPPLY DEVICE

BACKGROUND OF THE INVENTION

This invention relates to a power failure protected power supply device and, especially, to an improved power failure protected power supply device of voltage boosting type.

FIG. 1 shows a typical example of the power failure protected power supply device of this type according to the prior art, whose principle is disclosed, for example, in the Japanese opened utility model gazette No. H5(93)-25953. As shown, the device includes a pair of input terminals 10 and 12 to be connected to a commercial a.c. power supply of 100 volts, for example, and the input terminals 10 and 12 are connected through a high frequency noise removing coil 14 and a current limiting resistor 16 across a capacitor 18. The current limiting resistor 16 is connected in parallel with a triac 20. A full-wave charging circuit including switching elements 24 and 26 and capacitors 28 and 30 is further connected through an input reactor 22 across the capacitor 18 and the switching elements 24 and 26 are connected respectively in inverse parallel with diodes 32 and 34. The switching elements 24 and 26 may be insulated gate bipolar transistors (hereinunder referred to as IGBTs), for example.

During a positive halfwave period having a potential at the input terminal 10 which is higher than that at the input terminal 12, an input current flows through the high frequency noise removing coil 14 and current limiting resistor 16 to charge the capacitor 18. The voltage across the capacitor 18 becomes 140 volts when the effective value of the input voltage is 100 volts. Upon completion of charging, the triac 20 receives a gating signal from its control circuit (not shown) and comes into conduction to short-circuit the current limiting resistor 16. Throughout this period, the switching element 24 receives a gating signal at a frequency of 15 to 20 kilohertz, for example, from its control circuit (not shown) to repeat an ON-OFF operation. When the switching element 24 is in ON state, the input current through the triac 20 flows through the reactor 22 and the switching element 24 to the capacitor 28 together with the charge in the capacitor 18 to charge the same. At this time an energy is stored in the reactor 22. When the switching element 24 comes in OFF state, an inverse electromotive force is induced across the reactor 22 in the arrow direction by the stored energy and a sum of the inverse electromotive force and the voltage across the capacitor 18 is applied through the diode 34 to the capacitor 30. Thus, the capacitor 30 is charged in a polarity as shown and its voltage rises up to 280 volts, for example, while it is rendered 200 volts by control of the switching element 24.

On the other hand, during a negative halfwave period having the potential at the input terminal 10 lower than that at the input terminal 12, the input current flows from the input terminal 12 through the high frequency noise removing coil 14, capacitor 18, triac 20 and coil 14 to the input terminal 10 to charge the capacitor 18 in the opposite direction to the above. The input current also flows from the input terminal 12 through the high frequency noise removing coil 14, capacitor 28, diode 32, reactor 22, triac 20 and coil 14 to the input terminal 10 to charge the capacitor 28 in a polarity as shown. The switching element 26 also receives a gating signal at a frequency of 15 to 20 kilohertz, for example, from its control circuit (not shown) to repeat an ON-OFF operation throughout this negative half-wave period. When it is in the ON state, the current from the input terminal 12 through the high frequency noise removing coil 14 flows through the capacitor 30, switching element 26, reactor 22, triac 20 and coil 14 to the input terminal 10 together with the charge of the capacitor 18 to charge the capacitor 30 in the opposite polarity to what is shown. At this time, an energy is stored in the reactor 22. In the OFF state of the switching element 26, an inverse electromotive force is induced in the reactor 22 in the opposite direction to the arrow direction by the stored energy and a sum of the inverse electromotive force and the voltage of the capacitor 18 is applied through the diode 32 to the capacitor 28. Thus, the capacitor 28 is charged in the polarity as shown and its maximum voltage becomes about 200 volts under control of the switching element 26 as same as the above.

Thus, a boosted voltage is generated across the capacitors 28 and 30. Switching elements 36 and 38 constituting an invertor are further connected across the series connection of capacitors 28 and 30 and the junction between the switching elements 36 and 38 is connected through an output reactor 40 and a high frequency noise removing coil 42 to output terminals 44 and 46. The switching elements 36 and 38 may also be IGBTs and have diodes 48 and 50 respectively connected thereto in inverse parallel fashion.

During the above-mentioned positive halfwave period of the input a.c. voltage, if one switching element 38 is put into conduction for a predetermined time by a gating signal from its control circuit (not shown), the charge in the capacitor 30 flows through the switching element 38, output reactor 40, high frequency noise removing coil 42, output terminal 44, external load (not shown), output terminal 46 and coil 42. If the other switching element 36 is put into conduction for the predetermined time by a gating signal from its control circuit (not shown) during the negative halfwave period, the charge in the capacitor 28 flows through the high frequency noise removing coil 42, output terminal 46, external load (not shown), coil 42, output reactor 40 and switching element 36. In other words, an a.c. voltage synchronized with the input a.c. voltage is applied to the external load. The value of this output a.c. voltage is determined by the above-mentioned conduction time of the switching elements.

A switching element 52 such as bipolar transistor and a storage battery 54 are further connected in series across the series connection of the capacitors 28 and 30 and a diode 56 is connected to the switching element 52 in inverse parallel fashion. The switching element 52 is put into conduction by a gating signal from its control circuit (not shown) to charge the battery 54 with the charges of the capacitors 28 and 30. Even if the input a.c. voltage stops, the voltage across the battery 54 is converted into an a.c. voltage as same as the above and applied to the external load so long as the control circuit of the invertor means operates continuously to put the switching elements 36 and 38 into conduction alternatingly.

Numeral 58 denotes a triac connected between the input and output of the power supply device. When it is put into conduction by a gating signal from its control circuit (not shown), the input terminal voltage is applied through the high frequency noise removing coils 14 and 42 to the output terminals. Accordingly, it is possible to execute maintenance and inspecting operations for the power supply device in this state.

As described above, the voltages across the capacitors 28 and 30 become about 200 volts respectively when the commercial input voltage is 100 volts in this power supply device. Accordingly, the storage battery 54 to be substituted therefor at the time of power failure must be one which can generate a voltage above 400 volts and it involves such a problem of increased capacity of the battery 54 and accompanying increased size and weight of the device as a whole.

Accordingly, an object of this invention is to provide an improved voltage boosting power failure protected power supply device which can generate a high voltage using a battery of small capacity.

SUMMARY OF THE INVENTION

As same as the above-mentioned prior art device, the device of this invention also includes invertor means a pair of capacitors connected in series between input terminals of the invertor means, a pair of switching elements connected in series across the series connection of the capacitors, a pair of diodes connected respectively in inverse parallel to the switching elements, one terminal of an a.c. power supply connected through a reactor to the junction of the switching elements, another terminal of the a.c. power supply connected to the junction of the capacitors, and control means for putting one of said switching elements into conduction when the voltage between the power supply terminals has one polarity and putting the other switching element into conduction when the voltage has the other polarity, thereby charging the capacitors alternatingly.

A feature of this invention is that the device further comprises a normally-closed switch inserted between the junction of the switching elements and the reactor, a first normally-open switch and a storage battery connected in series between an end of the reactor in the side of the normally-closed switch and one input terminal of the invertor means, a third switching element connected between the other end of the reactor and one input terminal of the invertor means, a second normally-open switch connected between the other end of the reactor and the other input terminal of the invertor device 80, and means for sensing power failure to open the normally-closed switch, close the first and second normally-open switches and put the third switching element into intermittent conduction during the period of power failure.

This feature of the device according to this invention and particular functions based thereupon will be described in detail below about a preferred embodiment thereof with reference to the accompanying drawings.

BRIEF DESCRIPTION OF THE DRAWINGS

In the drawings.

Throughout both drawings, same reference numerals are given to corresponding circuit components.

DESCRIPTION OF THE PREFERRED EMBODIMENT

Figure 1:
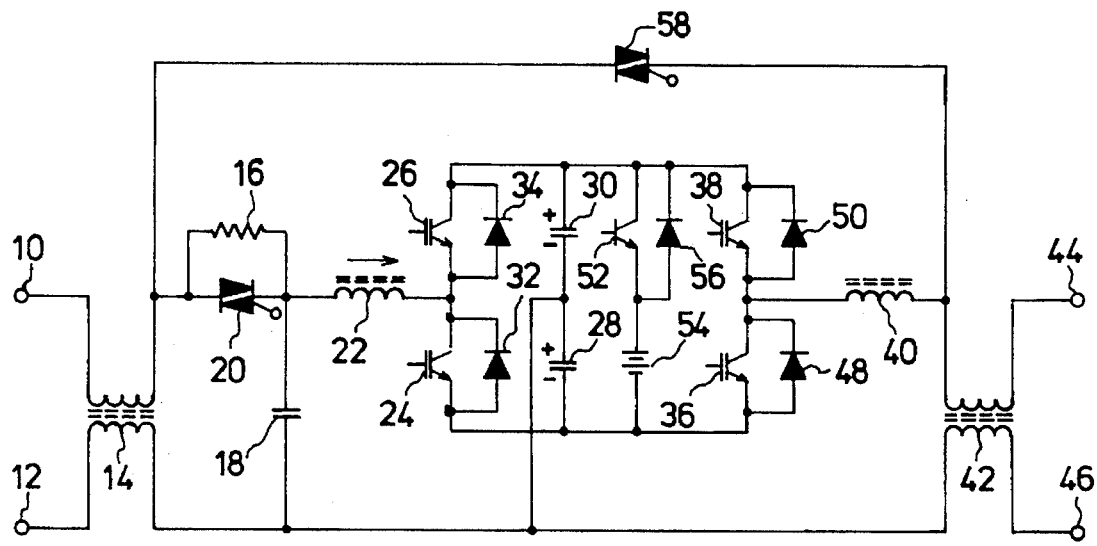
FIG. 1 is a schematic circuit diagram showing an exemplary model of the voltage boosting power failure protected power supply device according to the prior art.
Figure 2:
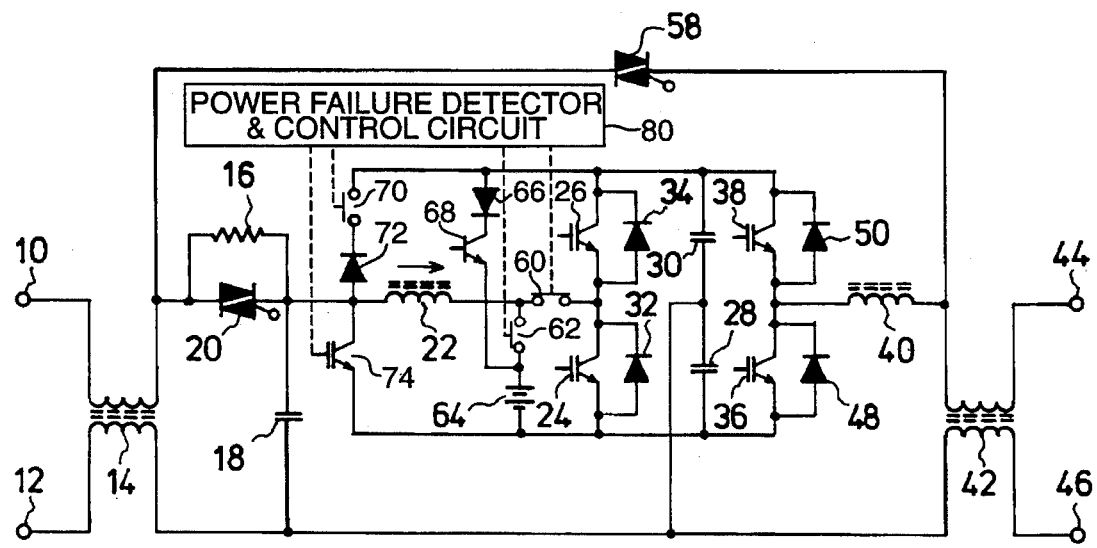
FIG. 2 is a schematic circuit diagram showing a preferred embodiment of the voltage boosting power failure protected power supply device according to this invention.

As is understood from comparison of FIGS. 1 and 2, the circuit of the embodiment of FIG. 2 is same as that of the prior art device of FIG. 1 in a substantial portion thereof. However, it has a normally-closed switch 60 inserted between the input reactor 22 and the junction of the switching elements 24 and 26 of FIG. 1, a series connection of diode 66 switching element 68 and storage battery 64 substituted for the series connection of the switching element 52 and battery 54 and a normally-open switch 62 inserted between the junction of the reactor 22 and switch 60 and the junction of the switching element 68 and battery 64. As shown, moreover, a series connection of normally-open switch 70, diode 72 and switching element 74 such as IGBT is inserted across the series connection of the capacitors 28 and 30 and the junction of the diode 72 and switching element 74 is connected to the input end of the reactor 22.

The normally-closed switch 60 is opened and the normally-open switches 62 and 70 are closed at the time of power failure by a separately disposed power failure detector and control 80. The switching element 74 is adapted to be put into intermittent conduction in response to a gating signal from control circuit 80, shown in block diagram form; and, time of power failure, though it maintains a non-conductive state in normal power condition.

It is understood that the device of FIG. 2 has a substantially same circuit configuration and effects the same function as the device of FIG. 1 in the normal condition as shown, in which the switch 60 is closed and the switches 62 and 70 are opened. In other words, if the input terminals 10 and 12 are connected to a commercial a.c. voltage source, a voltage boosted and synchronized with respect to the input voltage is generated across the output terminals 44 and 46. The battery 64 is charged by putting the switching element 68 into conduction by a control 80, the circuitry of which is not shown in detail.

When the input a.c. power supply stops, the switch 60 is opened and the switches 62 and 70 are closed as described above. At the same time, the switching element 74 commences ON-OFF operation. When the switching element 74 is in the ON state, the current from the battery 64 flows through the reactor 22 and switching element 74 to store an energy in the reactor 22. When the switching element 74 is in the OFF state, the stored energy becomes an electromotive force in the opposite direction to the arrow as shown and charges the capacitors 28 and 30 together with the voltage of the battery 64. The voltage across the capacitors 28 and 30 becomes much higher than the voltage of the battery 64 by effecting the ON-OFF operation of the switching element 74 at high speed, that is, by executing high frequency switching. Since the invertor including the switching elements 36 and 38 has the voltage across the capacitors 28 and 30 as its input voltage, the voltage of the battery 64 may be much lower than the former in contrast to the case of the prior art device. Thus, it is possible to maintain the capacity of the battery small to prevent the device from being large-sized.

The above description has been made for the illustrative purpose only and does not mean any limitation of the invention. It should be obvious to those skilled in the art that various modifications and changes can be made on the above-mentioned embodiment without leaving the spirit and scope of the invention as defined in the appended claim. For example, electromagnetic relays, electronic switches and the like may be optionally selected as the above-mentioned switches 60, 62 and 70 and a battery charging circuit for exclusive use may be provided instead of the diode 66 and switching element 68.

We claim:

1. A voltage boosting, power failure protected, power supply device comprising:

an inverter, a pair of capacitors connected in series between input terminals of said invertor, a pair of switching elements connected in series across the series connection of said capacitors, a pair of diodes connected respectively in inverse parallel to said switching elements, one input terminal of an a.c. power supply connected through a reactor to a junction of said switching elements, another input terminal of said a.c. power supply connected to a junction of said capacitors, and control means for putting one of said pair of switching elements into conduction when voltage across said terminals of said a.c. power supply has one polarity and putting the other of said pair of switching elements into conduction when said voltage has an opposite polarity, thereby charging said capacitors alternatingly;

wherein said device further comprises:

a normally-closed switch inserted between said junction of said switching elements and one end of said reactor, a first normally-open switch and a storage battery connected in series between said one end of said reactor and one input terminal of said invertor, a third switching element connected between the other end of said reactor and said one input terminal of said invertor, a second normally-open switch connected between said other end of said reactor and an other input terminal of said invertor, and means for sensing a power failure and opening said normally-closed switch, closing said first and second normally-open switches and putting said third switching element into intermittent conduction during a period of said power failure.

* * * * *